United States Patent [19]

Fulton et al.

[11] Patent Number: 4,461,987
[45] Date of Patent: Jul. 24, 1984

[54] CURRENT SENSING CIRCUIT FOR MOTOR CONTROLS

[75] Inventors: Donald E. Fulton, Stoneham; William P. Curtiss, Winthrop; William T. Fejes, Jr., Needham, all of Mass.

[73] Assignee: Allen-Bradley Company, Milwaukee, Wis.

[21] Appl. No.: 416,356

[22] Filed: Sep. 8, 1982

[51] Int. Cl.³ .............................................. H02P 5/40
[52] U.S. Cl. ...................................... 318/800; 318/729
[58] Field of Search ................................ 318/800–802, 318/807–811, 825–826, 798, 799, 729, 317; 363/41, 96; 361/30, 31

[56] References Cited

U.S. PATENT DOCUMENTS

| | | | |
|---|---|---|---|
| 4,322,671 | 3/1982 | Kawada et al. | 318/798 |
| 4,333,046 | 6/1982 | Lee | 318/729 |
| 4,400,657 | 8/1983 | Nola | 318/729 |
| 4,404,511 | 9/1983 | Nola | 318/729 |

Primary Examiner—J. V. Truhe
Assistant Examiner—Art Evans
Attorney, Agent, or Firm—Barry E. Sammons

[57] ABSTRACT

A current sensing circuit includes an impedance network having a capacitor which produces a voltage proportional to the steady-state component of current and an inductance which produces a voltage proportional to the transient component. The capacitor voltage modulates a carrier signal which conveys the steady-state component through an isolation transformer to a demodulator. The transient component is conveyed through a second isolation transformer and is summed with the demodulated steady-state component.

6 Claims, 6 Drawing Figures

CURRENT SENSING CIRCUIT FOR MOTOR CONTROLS

BACKGROUND OF THE INVENTION

The field of the invention is feedback circuits employed in motor control systems, and particularly, circuits for providing current feedback signals.

There are numerous control systems in which output current is sensed to form a feedback signal that is employed at the input of the system. For example, in electric motor drives accurate measurement of the instantaneous stator current of the motor may be required to control the high frequency pulse width modulation of the motor voltage to achieve control of the stator current. The successful operation of the motor control system may depend in such case on the accuracy of both the a.c. and d.c. components current feedback signal.

One common means for providing a current feedback signal is to employ a current transformer having its primary winding connected to conduct the current being measured. The disadvantage of using current transformers is that they do not respond to direct current. Another common current sensor is a Hall effect device in which the magnetic field produced by the current is sensed and is employed to generate the feedback signal. The disadvantage with Hall effect devices is that they lack gain stability, and give rise to d.c. offset errors. In addition Hall effect devices often have relatively low sensitivity. Although these two prior solutions are satisfactory in some applications, where high performance control systems are employed the lack of current transformer response to d.c. and the gain instability and insensitivity of Hall effects sensors limits the use of these prior devices in many applications.

Another solution is to measure the voltage drop across a resistor connected to conduct the current. Unfortunately, the current sensing resistor in many applications is connected at a point of high d.c. or a.c. voltage which must be isolated from the control system circuitry to which the current feedback signal is applied. This requires the use of a level shifting circuit which may introduce d.c. offset errors or common mode errors. Also, such a solution does not provide d.c. isolation between the control circuitry and the high voltage circuitry.

SUMMARY OF THE INVENTION

The present invention relates to a current sensing and feedback signal generating circuit which provides high d.c. and a.c. voltage isolation, low offset errors, high bandwidth, excellent linearity and accurate gain. More specifically, it includes a sensing resistor connected to conduct the current to be measured; an impedance network connected across the sensing resistor and including a capacitor in series with a first isolation transformer such that the sum of their voltage is the voltage produced across the sensing resistor, the capacitor in combination with the first isolation transformer's magnetizing inductance forming a frequency separation network in which the low frequency components appear across the capacitor and the high frequency components appear across the primary of the isolation transformer and are conveyed to its secondary winding; a modulator connected to the capacitor to produce a carrier signal having an amplitude determined by the instantaneous voltage across the capacitor; a second isolation transformer having a primary winding connected to the modulator and having a separate secondary winding; and a demodulator connected to the secondary winding of the second isolation transformer and being operable to reproduce the voltage across the capacitor from the carrier signal. A signal proportional to the voltage on the secondary winding of the first isolation transformer is added to the output of the demodulator to accurately reconstruct a signal proportional to the voltage waveform appearing across the sensing resistor. The low pass filter nature of the capacitor insures that no significant hetrodyning with the modulator carrier occurs in the modulator.

A general object of the invention is to accurately measure current level in a noisy high voltage environment. Isolation from the high voltage is obtained by passing the components of the feedback signal through isolation transformers. All components on the high voltage side of the isolation transformers are very low in impedance, thus making them insensitive to noise signals which might otherwise corrupt the current feedback signal.

Another object of the invention is to provide a current sensing circuit which has a wide bandwidth. The steady-state and low frequency components of the current feedback signal are developed across the capacitor and are employed to modulate the high frequency carrier which conveys the information through the second isolation transformer. The high frequency components of the feedback signal are conveyed directly by the first isolation transformer and are added to the demodulated signal to provide a wide band current feedback signal.

A more specific object of the invention is to provide d.c. isolation. This is accomplished by using isolation transformers to convey all components of the current feedback signal. High d.c. or a.c. voltages associated with the sensing resistor are blocked and do not contribute any offset to the current feedback signal.

Yet another specific object of the invention is to provide a current sensor for accurately sensing the stator currents in a polyphase a.c. motor so as to enable precise control of motor currents, thereby achieving low ripple torque. This is accomplished by the current sensor of the present invention which has a low offset error and linearity as well as predictable, stable gain resulting in the generation of a very accurate, sinusoidal feedback signal which allows for matching of the motor phase currents.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
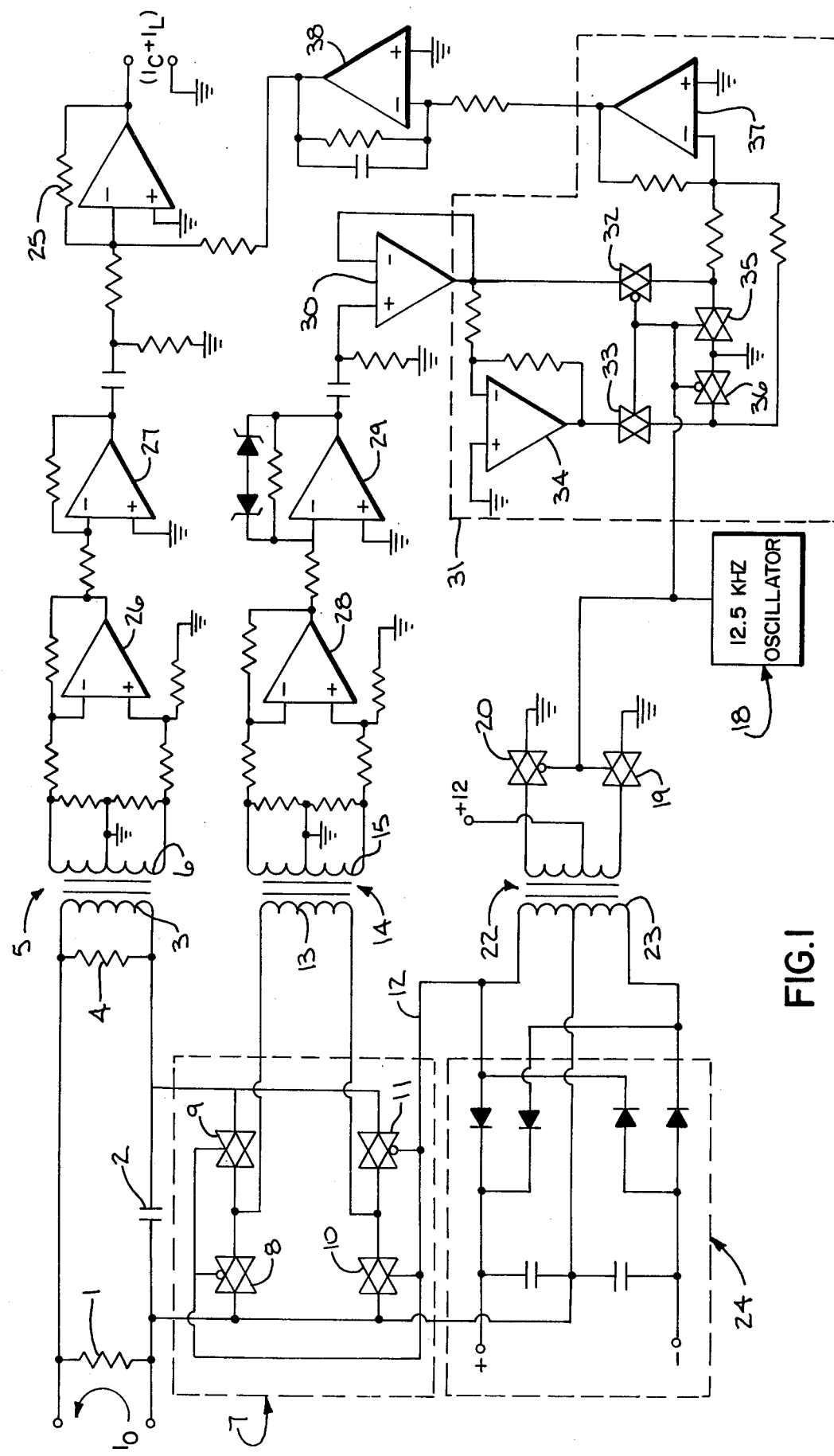
FIG. 1 is a schematic electrical diagram of the current feedback circuit of the present invention.

Referring particularly to FIG. 1, a current $I_o$ which is to be measured flows through a sensing resistor 1. A voltage drop is thus produced across the sensing resistor 1, and this is applied to an impedance network which includes a capacitor 2, inductance 3 and damping resistor 4. The inductance forms the primary winding of a high frequency, low d.c. resistance isolation transformer 5 which has a center tapped secondary winding 6. The impedance of the sensing resistor 1 is much less than the impedance of the impedance network so that almost all of the current $I_o$ passes through sensing resistor 1.

The voltage developed across the capacitor 2 is applied to the input of a modulator circuit indicated by dashed lines 7. The modulator 7 is comprised of four digitally controlled analog switches 8-11 which are connected to form a bridge network. MOS field effect transistors are employed as the switches 8-11 because of their zero offset. All four switches 8-11 are operated by a 12.5 KHz square wave carrier signal on a control line 12, with the opposing switches 9 and 10 being turned on when the carrier signal is positive and with the opposing switches 8 and 11 being turned on when the carrier signal is negative. The primary winding 13 of an isolation transformer 14 connects to the outputs of the modulator 7, and the voltage across the capacitor 2 is thus alternately applied to this winding 13 with first one polarity then the other at the 12.5 KHz carrier frequency. This amplitude modulated signal is coupled to a center tapped transformer secondary winding 15.

The 12.5 KHz carrier signal is generated by an oscillator 18 which drives a pair of digitally controlled analog switches 19 and 20. The switches 19 and 20 connect to the primary winding 21 of a third isolation transformer 22. The center tap of the primary winding is coupled to a twelve volt supply voltage. Switches 19 and 20 are alternately rendered conductive by the carrier signal and the 12.5 KHz carrier induced in a secondary winding 23 of the isolation transformer 22 is employed to drive the modulator switches 8-11 through line 12. In addition, it is rectified and filtered by a power supply circuit 24 to provide a d.c. supply voltage for the switches 8-11.

Figure 2A:
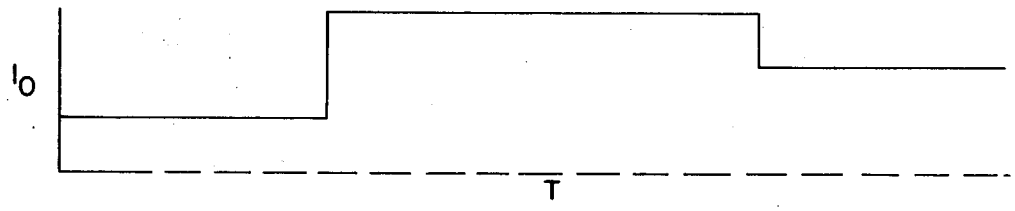
FIGS. 2A-2E are graphic representations of signals which appear at various points in the circuit of FIG. 1.
Figure 2B:
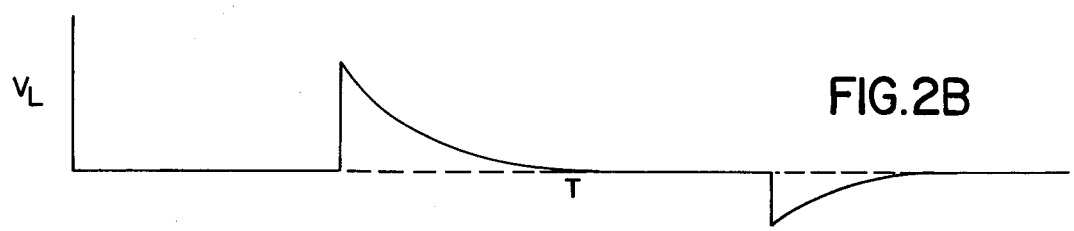

The first isolation transformer 5 serves as a means for coupling the high frequency components of the sensed current $I_o$ to a summing amplifier 25. Referring to FIGS. 2A and 2B, if the current ($I_o$) flowing through the resistor 1 suddenly increases in value, then a voltage will be momentarily produced across the primary winding 3 of the transformer 5 due to its inductive reactance. This voltage will induce a corresponding voltage ($V_L$) in the secondary winding 6 which is applied to the differential inputs of an operational amplifier 26. This momentary voltage is amplified further by an operational amplifier 27 which couples to the inverting input of the summing amplifier 25. If the measured current ($I_o$) drops in value, a corresponding negative voltage ($V_L$) is induced in the secondary of the transformer 5 and is amplified and applied to the summing amplifier 25. This voltage ($V_L$) is one component of the current feedback signal, and it represents the high frequency components of the sensed current ($I_o$).

The combination of the capacitor 2, the resistance 4 and the inductance of transformer 5 form a cross over network which passes only the low frequency components of the current feedback signal to the modulator. The cut-off frequency of the cross over network is selected by choosing the values of the crossover network components such that the cut off frequency is much lower than the 12.5 KHz carrier frequency, thereby avoiding hetrodyning with the carrier frequency.

Figure 2C:
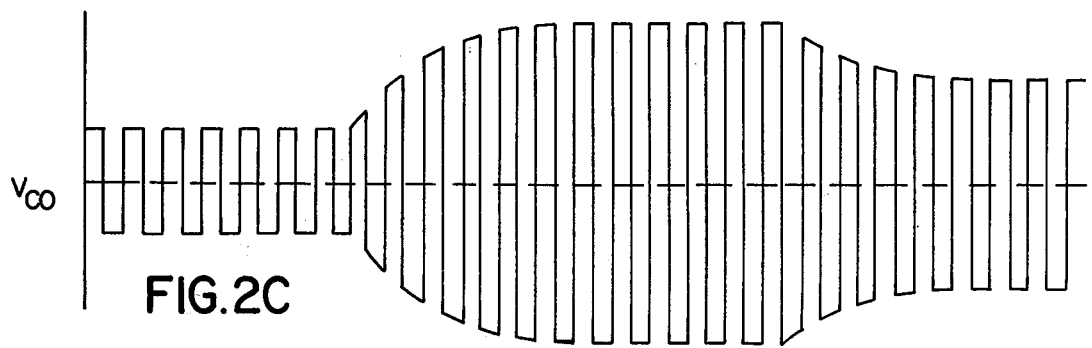

The other component of the current feedback signal is developed across the capacitor 2. Referring particularly to FIGS. 1 and 2C, the voltage across the capacitor 2 is equal to the voltage drop across the sensing resistor 1 under steady-state conditions. This voltage is applied to the modulator 7 which alternately connects it across the primary winding 13 at the 12.5 KHz carrier frequency. This voltage induces a voltage ($V_{co}$) in the secondary winding 15 of the isolation transformer 14 which is applied to the differential inputs of an operational amplifier 28. This component of the current feedback signal represents the steady-state and low frequency components of the sensed current ($I_o$), and it is amplified further by operational amplifiers 29 and 30. This low frequency component of the feedback signal also contains the 12.5 KHz carrier signal which is removed by a demodulator 31.

Figure 2D:
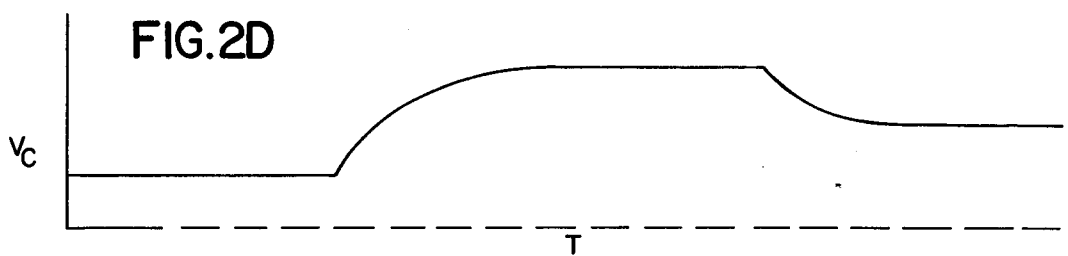
Figure 2E:
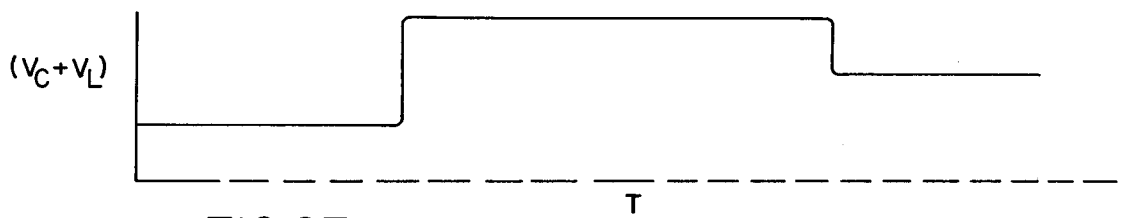

The demodulator 31 includes a pair of digitally controlled analog switches 32 and 33, each a MOS field effect transistor, which are alternately closed by the 12.5 KHz reference signal from the oscillator 18. The output of the amplifier 30 connects directly to the switch 32 and the inversion of the same signal is applied to the switch 33 by operational amplifier 34. Analog switches 35 and 36 connect to the outputs of respective switches 32 and 33 and they are operated by the same 12.5 KHz reference signal to ground the outputs of switches 32 and 33 when they are not conductive. The outputs from the analog switches 32 and 33 are summed by an operational amplifier 37 to produce a signal ($K_1V_c$) which is shown in FIG. 2D.

While low offset is obtained by configuring the analog switches of the modulator and demodulator of MOS field effect transistors, there may be instances where very low offset is desirable. To reduce the offset even lower, the offset due to the switching spikes of the modulator switches can be removed at the demodulator by choosing the demodulator wave form so that zero gain results during the modulator switching spikes.

The signal ($K_1V_c$) is amplified and filtered (to reduce carrier ripple) by an operational amplifier 38 and applied to the inverting input of the summing amplifier 25. The high frequency component ($K_2V_L$) of the feedback signal is added to the low frequency component ($K_1V_c$) at the input to summing amplifier 25 to produce a current feedback signal $K(V_c+V_L)$ which accurately reflects the instantaneous value of the sensed current ($I_o$).

To better understand why the output signal of amplifier 25 does in fact reflect the input voltage across the sense resistor it will be helpful to write the circuit equation for the voltage across both the capacitor 2 and the inductance of transformer 5. The voltage $V_c$ across the capacitor is given by the following equation $$V_c = \left[ \frac{(L/R)s + 1}{LCs^2 + (L/R)s + 1} \right] V_S \tag{1}$$

where
$V_S$ is the voltage across sensing resistance 1
L is the magnitude of the magnetizing inductance of transformer 5
C is the magnitude of the capacitance 2
R is the magnitude of resistance 4

The voltage $V_L$ across the parallel combination of the primary 3 of the transformer 5 and resistance 4 is given by the following equation $$V_L = \left[ \frac{LCs^2}{LCs^2 + (L/R)s + 1} \right] V_S \quad (2)$$

Assuming that the combined gain of amplifiers 26 and 27 is K, then the output Voltage $V_A$ of amplifier 27 which is applied to the invert input of amplifier 25 is given by the following equation $$V_A = KV_L = \left[ \frac{KLCs^2}{LCs^2 + (L/R)s + 1} \right] V_S \quad (3)$$

If the modulator and demodulator circuits have a combined gain of K and the gain of amplifier 38 is unity then the output voltage of amplifier 38 is given by the following equation $$V_B = KV_C = \left[ \frac{K(L/R)s + 1}{LCs^2 + (L/R)s + 1} \right] V_S \quad (4)$$

Since the output voltages $V_A$ and $V_B$ of amplifiers 27 and 38 are effectively summed by amplifier 25, then a net voltage $V_o$ at the output of summing amplifier 25 is given by the following equations:

$$V_o = V_A + V_B = \left[ \frac{KLCs^2}{LCs^2 + (L/R)s + 1} \right] V_S + \quad (5)$$

$$\left[ \frac{K[(L/R)s + 1]}{LCs^2 + (L/R)s + 1} \right] V_S$$

$$V_o = K \left[ \frac{LCs^2 + (L/R)s + 1}{LCs^2 + (L/R)s + 1} \right] V_S$$

so that $$V_o = KV_S \quad (6)$$

Since the voltage $V_S$ across resistance $R_S$ as given by the equation $$V_S = I_o R_S \quad (7)$$

where $R_S$ is the magnitude of the sensing resistance, it can easily be seen that $$V_o = KV_S = KI_o R_S \quad (8)$$

so that $V_o$ is directly proportional to $I_o$, the sensed current.

The gain of the current sensor is principally dependent on turns ratio of transformers 5 and 14 as well as the gain of the various amplifiers and the magnitude of the sensing resistance 1. However the gain is not sensitive to the component value magnitudes of the impedance network, including the damping resistor. Thus by selecting the transformers, the gain setting resistors and amplifiers of the present current sensor to be linear, stable and of tight tolerance, the current sensor gain can accordingly be made accurate, stable and linear.

The damping resistor 4 is employed to damp undesirable resonances. If the sensed current contains frequency components near the resonance point of the capacitance/magnetizing inductance impedance network, excessive resonant currents can adversely effect the operation of the circuit. The damping resistor 4 is preferably connected as shown, but it may also be placed across the secondary of the transformer 5 or across the capacitor 2. In any case, its value is chosen to critically damp the series resonant circuit.

Where the current sensor of the present invention is employed to sense the current present in an a.c. motor drive, it is desirable that the current sensor reject high frequency and high amplitude common mode a.c. Since the ability of the current sensor to reject high frequency and high amplitude common mode a.c. is dependent on the ability of transformers 5, 14 and 22 to reject the common mode a.c., the transformers are selected to provide high frequency and high amplitude common mode a.c. rejection.

We claim:

1. A current sensing circuit for indicating the magnitude of a current which comprises:
    a sensing resistor connected to generate a voltage which is indicative of the magnitude of the current to be sensed;
    an impedance network connected across the sensing resistor and including a capacitor connected in series with a primary winding of a first isolation transformer;
    a modulator connected to the capacitor to produce a high frequency signal having its amplitude modulated by a voltage developed across the capacitor;
    a second isolation transformer having a primary winding connected to the modulator and having a secondary winding;
    a demodulator connected to the secondary winding of the second isolation transformer and being operable to reproduce the voltage appearing across the capacitor from the high frequency modulated signal to provide a low frequency signal; and
    a summing circuit connected to a secondary winding on the first isolation transformer and connected to the demodulator, the summing circuit being operable to add the low frequency signal to the signal developed across the secondary winding of the first isolation transformer to provide a summed signal proportional to the voltage developed across the sensing resistor.

2. The current sensing circuit as recited in claim 1 in which a damping resistor is connected to the impedance network.

3. The current sensing circuit as recited in claim 1 which includes a third isolation transformer that generates an unmodulated high frequency signal at its secondary winding which is coupled to the modulator.

4. The current sensing circuit as recited in claim 3 in which a power supply connects to the secondary winding of the third isolation transformer to provide d.c. electrical power from the unmodulated high frequency signal.

5. The current sensing circuit as recited in claim 4 in which the modulator employs field effect transistors which connect to the power supply.

6. The current sensing circuit as recited in claim 4 which includes an oscillator connected to supply unmodulated high frequency power to a primary winding on the third isolation transformer and to the demodulator.

* * * * *